United States Patent [19]
van Zijderveld

[11] Patent Number: 5,816,389
[45] Date of Patent: Oct. 6, 1998

[54] CONVEYOR MAT BUILT UP OF PLASTIC MODULES AND MODULES FOR SUCH A CONVEYOR MAT

[75] Inventor: George Johannes van Zijderveld, CN's-Gravenzande, Netherlands

[73] Assignee: MCC Nederland B.V., Netherlands

[21] Appl. No.: 802,681

[22] Filed: Feb. 19, 1997

[30] Foreign Application Priority Data

Feb. 19, 1996 [NL] Netherlands ............................ 1002390

[51] Int. Cl.⁶ .................................................. B65G 17/00
[52] U.S. Cl. ............................................................ 198/850
[58] Field of Search .................................... 198/636, 637, 198/638, 850, 851, 853

[56] References Cited

U.S. PATENT DOCUMENTS 5,551,554  9/1996  Wilson et al. ........................... 198/637
5,634,550  6/1997  Ensch et al. ............................. 198/853

FOREIGN PATENT DOCUMENTS 0 066 530  8/1982  European Pat. Off. .
A 2 132 153  7/1984  United Kingdom .
A 2 231 318  11/1990  United Kingdom .

Primary Examiner—William E. Terrell
Assistant Examiner—Khoi H. Tran
Attorney, Agent, or Firm—Varnum, Riddering, Schmidt & Howlett LLP

[57] ABSTRACT

A conveyor mat comprising first and second plastic modules built up of hinge plates, the width of the first modules substantially being twice the width of the second modules, the second modules being located only at both sides of the conveyor mat, with always a first module being arranged between two successive second modules at a side, the modules being coupled together by means of hinge pins, and each second module being provided at a side of the conveyor mat with a bearing surface formed integral with the module, which bearing surface extends in the same plane as the conveying plane of the mat, each bearing surface, seen in the conveying direction of the mat, having a length equal to twice the pitch of a module. The bearing surfaces form a dead plate moving along with the mat, for bridging the gap in the transition between two adjoining conveyor mats being at right angles to each other.

2 Claims, 2 Drawing Sheets

CONVEYOR MAT BUILT UP OF PLASTIC MODULES AND MODULES FOR SUCH A CONVEYOR MAT

BACKGROUND OF THE INVENTION

FIELD OF THE INVENTION

The invention relates to a conveyor mat built up of first and second modules formed integral of plastic, the width of the first modules substantially being twice the width of the second modules, the modules, seen in the longitudinal direction of the mat, being staggered relative to each other, each module consisting of a number of substantially equidistant hinge plates, which each extend over substantially the entire length of the module and are each provided at both ends with hinge loops, the hinge plates of a module being coupled together by at least a rib located between both ends, the ends of the hinge plates being located at a longitudinal side of a module between the ends of the hinge plates of a module adjoining in the longitudinal direction of the mat, with the hinge loops of both modules substantially being aligned, and being coupled together by a hinge pin extending through the hinge loops, and means being provided for locking the hinge pin relative to the modules.

Such a conveyor mat built up of modules is known from EP-A-0598453 and is used, for instance, in the packaging industry, in bottling plants and the like, in which the mat may have a relatively large width, up to a few meters, and is designed as an endless conveyor mat which at the beginning and the end of a conveyor path passes over sprockets arranged over the width of the conveyor.

In practice, it is often desirable that articles can be transferred from a conveyor mat to an adjoining conveyor mat, the conveying directions of both mats being perpendicular to each other. In case of such a transition between two mats the "end" of one mat adjoins the side of the other mat where the forward conveying part of the mat passes about a sprocket. At the transition this causes a gap between the conveying surfaces of both mats, because the mat running over the sprocket passes downward from the conveying plane with the radius of the sprocket, at some distance from the side of the other mat running perpendicular thereto.

It is known to fill such a slit between two mats with a so-called dead plate, that is to say a plate-shaped piece of metal or plastic ensuring that the articles can be moved from one mat to the other under the influence of the push of articles on the mat against articles on the dead plate.

It is a drawback of such a dead plate that, occasionally, articles on the dead plate remain stationary for some time, which, for instance, is inconvenient when during production one switches over to another article, because in that case the article that remained stationary may get between the new articles.

It has already been proposed that in a conveyor mat each module situated at the side of the mat adjoining the conveyor mat passing about a sprocket be provided with a plate-shaped end piece with a bearing surface, which extends, in the conveying plane of the mat, laterally over the entire length of a module and bridges the slits between two adjoining conveyor mats being perpendicular to each other in the conveying plane. Here the bearing surfaces of the successive plate-shaped end pieces form, so to speak, a moving dead plate. This proposal has the advantage that as a result of the movement of the dead plate the risk that the articles will remain stationary is substantially lower. According to the known proposal, two pins are formed at the bearing surface of each plate-shaped end piece, which pins extend into the openings for the hinge pins already present in the modules. By means of the locking member used in existing conveyor mats to lock the hinge pin in the hinge opening, the pins in the end piece are also locked by means of the locking member.

SUMMARY OF THE INVENTION

The object of the invention is to improve the known proposal, for which purpose the invention provides a conveyor mat of the above type, characterized in that at a side of the conveyor mat each second module comprises a bearing surface formed integral with the module, which bearing surface extends in the same plane as the conveying plane of the mat, and that each bearing surface, seen in the conveying direction of the mat, has a length equal to twice the pitch of a module.

The measure according to the invention gives a number of advantages over the known proposal. In the first place, the risk that the end piece will break off the module, which in the known construction may easily happen when the pins break off, no longer exists, because the end piece is manufactured integral with a second module by injection molding. In the second place, the number of parts when assembling a mat is smaller, because there are no separate end pieces, only two types of second modules, with and without an additional bearing surface, and because at a side of the mat locking clips for the hinge pins need not be arranged anymore, because this function is taken over by the end piece. Finally, it is a great advantage that, because the length of the bearing surface is twice the pitch length of the module, the number of transitions between bearing surfaces is half of the number of transitions in the known construction. Every transition involves, certainly in case of wear on the mat, the risk that an article will be pushed down during conveyance, which leads to undesirable failures in conveyance. With halving the number of transitions the risk of failures is also reduced to half.

BRIEF DESCRIPTION OF THIS DRAWINGS

The invention will be explained below by means of a practical example with reference to the accompanying drawings, in which.

DETAILED DESCRIPTION

Figure 1:
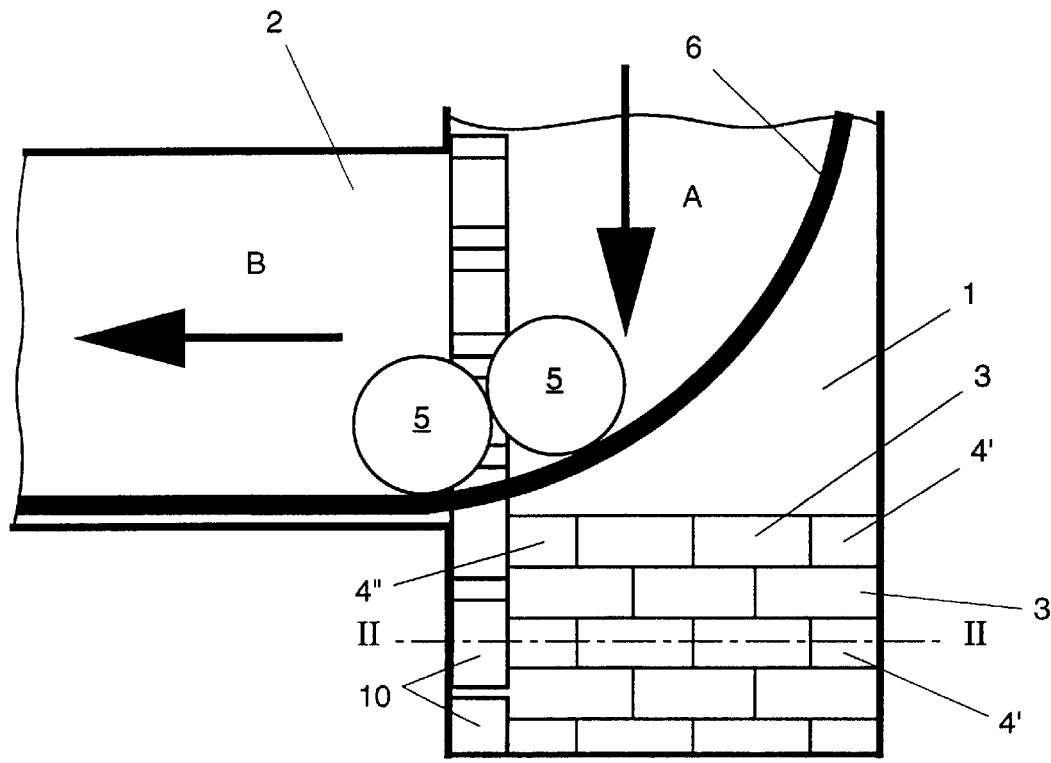
FIG. 1 is a top view of a transition between two conveyor mats.

FIG. 1 is a very diagrammatic representation of a top view of the transition between two conveyor mats 1 and 2 of the type described in, for instance, EP-A-0598453, and comprising first modules 3 and second modules 4' and 4", which adjoin each other in the manner of bricks, with only at the sides of a mat, always between two first modules, a second module being provided. The conveying direction of the mats is indicated by the arrows A and B. Articles 5 supplied on the mat 1 are transferred to the mat 2 via a guide 6.

Figure 2:
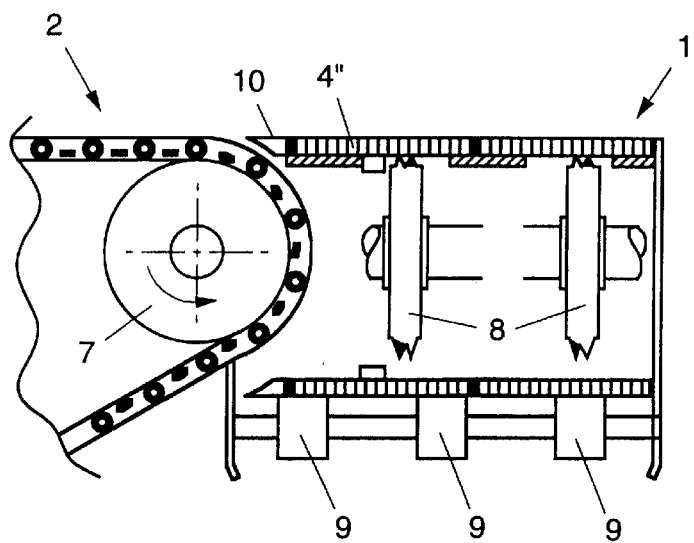
FIG. 2 is a cross-sectional side view taken along the lines II—II in FIG. 1.
Figure 3:
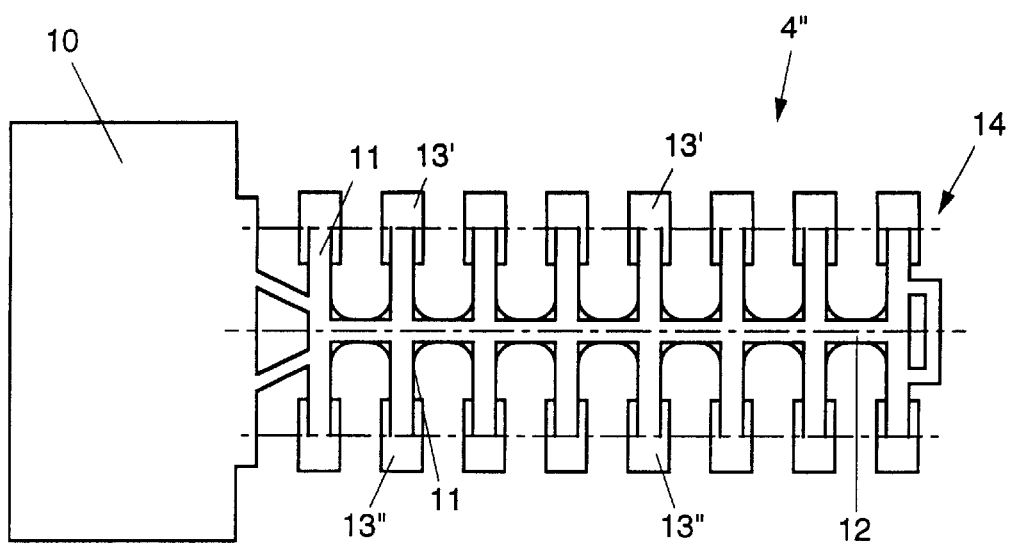
FIG. 3 is a top view of a second module for a conveyor mat according to the invention.

As clearly shown in FIG. 2, a gap is formed between the mat 1 and the mat 2 if no additional measures are taken, because at the transition between the mats the mat 2 passes about a sprocket 7. The mat 1 is driven by means of sprockets 8, and the backward part of the mat, seen in the figure at the lower side, passes over and is supported by rollers 9.

According to the invention each second module 4" comprises a bearing surface 10 formed integral with the module. These bearing surfaces bridge the gap between the mats 1 and 2 and have the advantage that since they move along with the mat, they convey the articles located on the bearing surfaces in the direction of the guide 6, with the result there is no risk that articles will remain stationary for some time on the bridge between the mats 1 and 2, the so-called dead plate, which risk does exist if the dead plate is stationary. Because every second module 4" comprises a bearing surface which, seen in the conveying direction of the mat 1, has a length equal to twice the pitch of the mat modules, there are relatively few transitions between adjoining bearing surfaces, and the risk that an article 5 will be pushed down owing to such a transition is low.

The first and second modules, respectively 3 and 4', 4", are each formed integral and are, for instance, made by means of injection molding. Since the first modules of the conveyor mat according to the invention are of a conventional type, as described in, for instance, EP-A-0598453, the structure of the first modules will not be discussed further, because this structure will be clear to those skilled in the art. The second modules each comprise a number of substantially identical equidistant hinge plates 11. The hinge plates are interconnected by means of a rib 12. Each hinge plate 11 is provided at both ends at both sides of the body of the hinge plate with thickened hinge loops 13', 13", in which is formed an opening 14 for a hinge pin. The hinge loops and openings are so designed that all the openings of the modules are aligned, also when the hinge plates of two modules adjoining in the longitudinal direction of the mat engage with each other, because the hinge plates of a module are always located between the hinge plates of the other module. Thus, the length of a module is determined by the number of hinge plates of which it is composed, and the width of a module is determined by the length of a hinge plate. The pitch of the module is the distance between the central axes of the openings 14 in the hinge loops 13' and 13".

The ribs 12 form an engaging surface for the sprockets driving the mat. Since the drive of a conveyor mat forms no part of the invention and is also well-known to those skilled in the art, it is not shown further in the figure.

Figure 4:
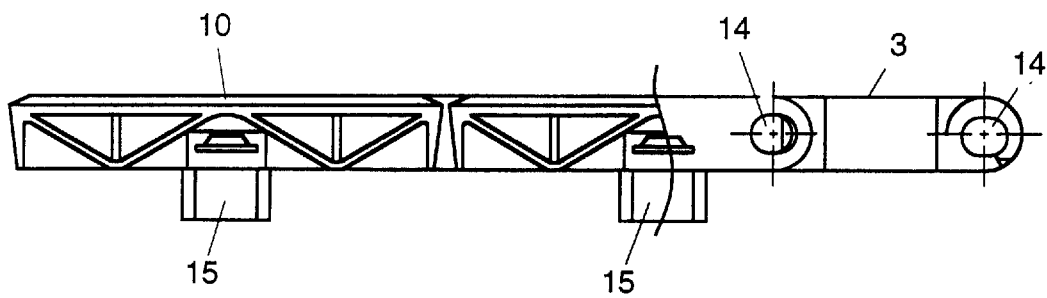
FIG. 4 is a transverse view of a number of modules shown in FIG. 3.
Figure 5:
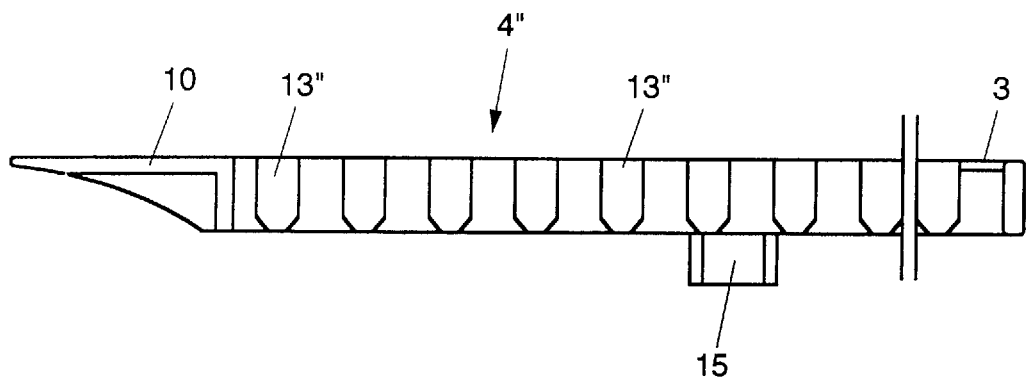
FIG. 5 is a side view of a module shown in FIG. 3.

Provided at the end of the module 4" is a bearing surface 10 integral therewith, which with the bearing surfaces of the other modules 4" forms a moving dead plate, at a side of the mat. As clearly shown in FIG. 4, in which, for clarity's sake, the bearing surfaces 10 are not drawn on the right-hand side, each bearing surface has a width such that it extends to halfway the length of an adjoining first module 3, of which always one is present between two successive modules 4' or 4".

Formed at the lower side of the second modules are cam-shaped stops 15 for cooperating with a guide rail, not shown, so as to prevent the rail from laterally shifting, under the pressure of the articles. Such a cam-shaped guide is described in NL-A-1000640.

It will be clear that with the measures according to the invention the above advantages are obtained. Besides, the mat can be easily assembled, because the number of different parts is minimal, while at the side of the second modules 4" no clips for locking the hinge pins need be provided, which is very labor-saving.

Although the figures show a mat of the so-called "flush grid" type, the invention is applicable with the same effect to a mat of the so-called "flat top" type, in which each module has a closed upper surface.

It is claimed:

1. A conveyor mat built up of first and second modules formed integral of plastic, each of the modules having, a pitch a length, and a width, the width of the first modules substantially being twice the width of the second modules, the modules, seen in the longitudinal direction of the mat, being staggered relative to each other, each module comprising first and second substantially equidistant hinge plates, which each extend over substantially the entire length of the module and each have two ends, each hinge plate provided at both ends with hinge loops, the hinge plates of each module being coupled together by at least a rib located between both ends, both ends of a hinge plates being located at a longitudinal side of a first module between the ends of the hinge plates of a second module adjoining in the longitudinal direction of the mat, with the hinge loops of both modules substantially aligned, and being coupled together by a hinge pin extending through the hinge loops characterized in that at a side of the conveyor mat each second module comprises a bearing surface formed integral with the module, which bearing surface extends in the same plane as the conveying plane of the mat, and that each bearing surface seen in the conveying direction of the mat has a length equal to twice the pitch of a module.

2. The conveyor mat in accordance with claim 1 wherein the second modules each comprise a laterally extending bearing surface formed integral therewith.

* * * * *

UNITED STATES PATENT AND TRADEMARK OFFICE
CERTIFICATE OF CORRECTION

PATENT NO. : 5,816,389
DATED : Oct. 6, 1998
INVENTOR(S) : George Johannes van Zijderveld It is certified that error appears in the above-indentified patent and that said Letters Patent is hereby corrected as shown below:

```
Col. 4, line 26:
     insert --,-- between pitch and a length
Col. 4, line 35:
     delete "plates" and substitute therefore --plate--
```

Signed and Sealed this

Fifth Day of January, 1999

*Attest:*

*Attesting Officer*   *Acting Commissioner of Patents and Trademarks*